E. M. HENLE.
SLED RUNNER ATTACHMENT FOR WHEELED VEHICLES.
APPLICATION FILED MAR. 13, 1908.
921,109.
Patented May 11, 1909.
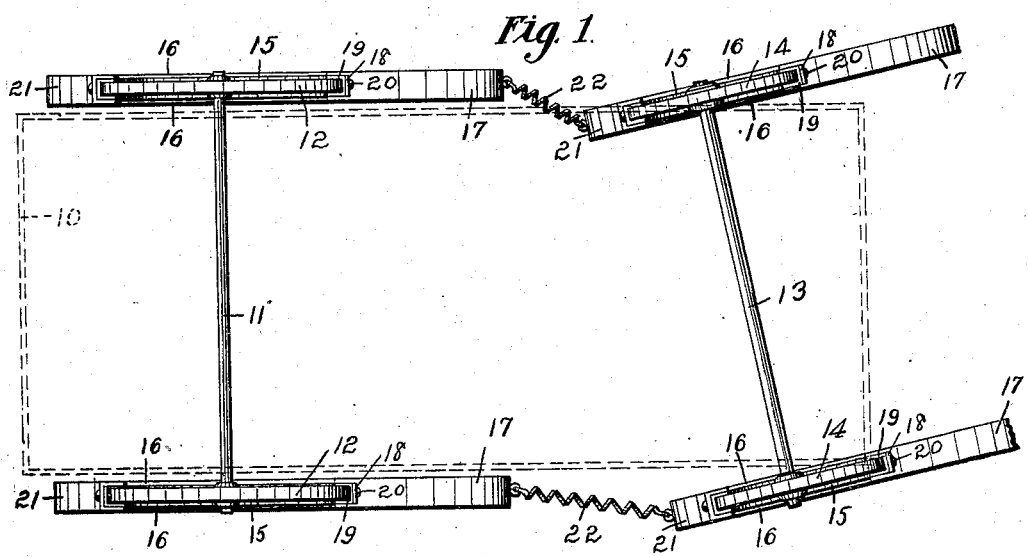
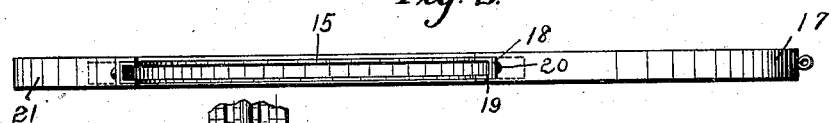
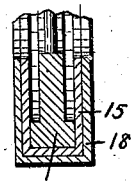
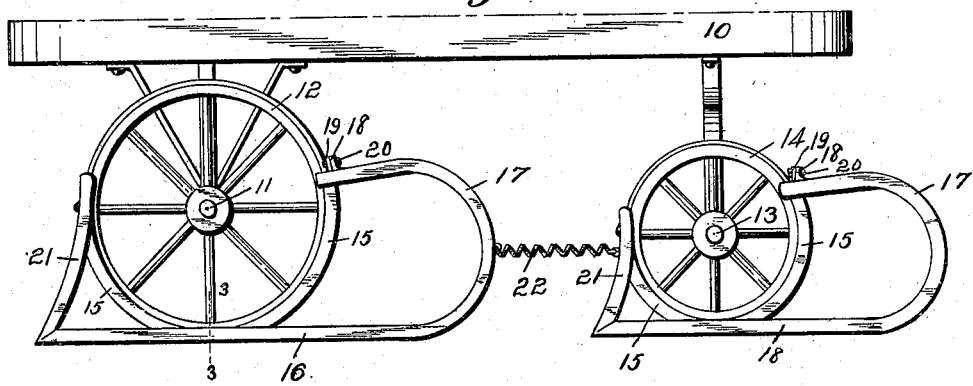
Witnesses.
F. C. Dahlberg
A. G. Hague
Inventor:
Edward M. Henle.
by Irving T. Lane Atty's.

UNITED STATES PATENT OFFICE.

EDWARD M. HENLE, OF OGDEN, IOWA, ASSIGNOR TO WAGNER MANUFACTURING COMPANY, OF CEDAR FALLS, IOWA, A CORPORATION OF IOWA.

SLED-RUNNER ATTACHMENT FOR WHEELED VEHICLES.

No. 921,109.

Specification of Letters Patent.

Patented May 11, 1909.

Application filed March 13, 1908. Serial No. 420,935.

*To all whom it may concern:*

Be it known that I, EDWARD M. HENLE, a citizen of the United States, residing at Ogden, in the county of Boone and State of Iowa, have invented a new and useful Sled-Runner Attachment for Wheeled Vehicles, of which the following is a specification.

The object of my invention is to provide a device of simple, durable and inexpensive construction, that may be readily, quickly and easily attached in a permanent manner to a four wheeled vehicle, without screws or bolts or similar fastening devices, to thereby provide four independent sled runners for the wheels.

A further object is to provide means for normally holding the forward and rear sled runners in line with each other, which means are capable of yielding so that the sled runners may be turned relative to each other with rounding curves.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a top or plan view of a device embodying my invention and having wheels inserted in the sled runners. Fig. 2 shows a top or plan view of one of the sled runners detached. The dotted lines therein show the position that a wheel would assume if placed therein. Fig. 3 shows an enlarged detail sectional view on the line 3—3 of Fig. 4, and Fig. 4 shows a side elevation of a wheeled vehicle having my sled runner attachments applied thereto.

Referring to the accompanying drawings, I have used the reference numeral 10 to indicate the vehicle body having the runner axle 11 provided with wheels 12 and a pivoted forward axle 13 provided with wheels 14.

My invention is intended to be applied to vehicles of all kinds, but is especially adapted for use in connection with small wheeled vehicles intended for use by children, and known as "coasters".

The sled runner attachments for each of the wheels is substantially the same, except that those for the forward wheels are smaller than those for the rear wheels. Each comprises a wheel receiving member formed of a spring metal channel bar 15 of segmental form, and of a length comprising slightly more than a half circle. The sled runner is formed complete of a single channel bar of a size to admit the channel bar 15 into it. It comprises a flat bottom 16, into which the member 15 is inserted. A curved forward end 17 having a lug 18 thereon designed to stand adjacent to a lug 19 on the part 15, which lugs are connected by a bolt or rivet 20.

The rear end of the sled runner comprises an upright channel bar 21 formed on or fixed to the rear end of the part 16, and having the rear end of the part 15 inserted in it.

In order to yieldingly hold the forward and rear sled runners in line with each other, I have provided springs 22 attached to the forward ends of the rear sled runners and the rear ends of the forward sled runners. When the forward and rear sled runners are in line, the springs are under a certain amount of tension and when the pressure is applied to the forward sled runners, to turn them laterally, one spring will be stretched, as shown in Fig. 1, thus applying tension to it tending to return the forward sled runners to position in line with the rear ones.

In practical use, and assuming that it is desired to attach the sled runners to the wheels of a vehicle, the operator places the sled runners in position upon a support and then places the wheels in the spring channel bars 15 and then forces the wheels downwardly in them, thus causing the ends of the channel bars 15 to stretch sufficiently to receive the wheels, and then when the wheels are in position, they will spring back above the horizontal centers of the wheels and thus be yieldingly held to the wheels on account of the resiliency of the spring metal.

The sled runners are also held against lateral movement relative to any wheel, because the wheel tires rest in the channel bars and the members 16 of the sled runners are prevented from lateral movement relative to the parts 15, because the parts 15 are inserted between the sides of the channel bars 16.

Having thus described my invention, what I claim and desire to secure by Letters Patent, is—
1. An improved vehicle runner comprising a channel bar made of spring metal, and of segmental shape, and comprising slightly more than a half circle, said channel bar being designed to receive a vehicle wheel, and a runner member made of a metal channel bar large enough to admit the first mentioned channel bar therein, and comprising a flat body portion, a forward end portion curved upwardly and then rearwardly, and having the upper end of the first mentioned channel bar admitted in the end thereof, and secured thereto, the rear end of the latter mentioned channel bar being extended upwardly and having the rear end of the first mentioned channel bar inserted therein, and attached thereto.

2. A runner attachment for vehicles comprising a front wheel runner formed of a piece of channel bar made of spring metal and of segmental shape, and comprising slightly more than a half circle, a second piece of channel bar comprising a flat bottom portion, a forward end portion extended upwardly and then rearwardly, and a rear end portion extended upwardly, the first mentioned channel bar being inserted in the channel of the second bar at the bottom, front and rear, and being permanently connected therewith, a rear runner attachment similar to the said front runner attachment, and a coil spring attached to the forward end of the rear attachment, and the rear end of the forward attachment, for the purposes stated.

Des Moines, Iowa, Jan. 2, 1908.

EDWARD M. HENLE.

Witnesses:
W. SCHWENE,
H. E. SOUDEN.